July 9, 1929. A. C. ROWLEY 1,720,444
BY-PASS CHECK VALVE FOR SPRINKLER SYSTEMS
Filed March 5, 1925 3 Sheets-Sheet 1

Inventor.—
Arthur C. Rowley.
by his Attorneys.—
Howson & Howson

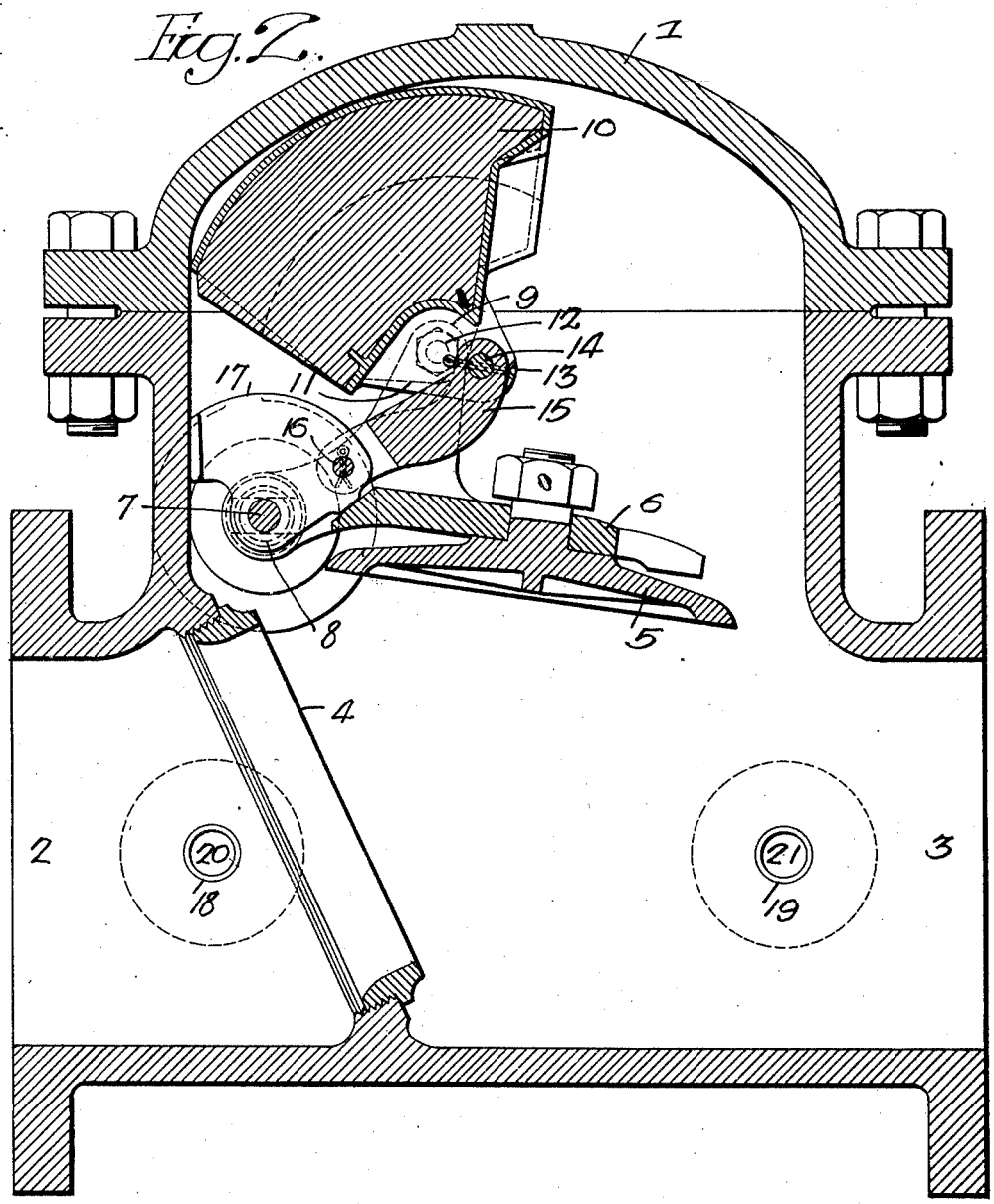

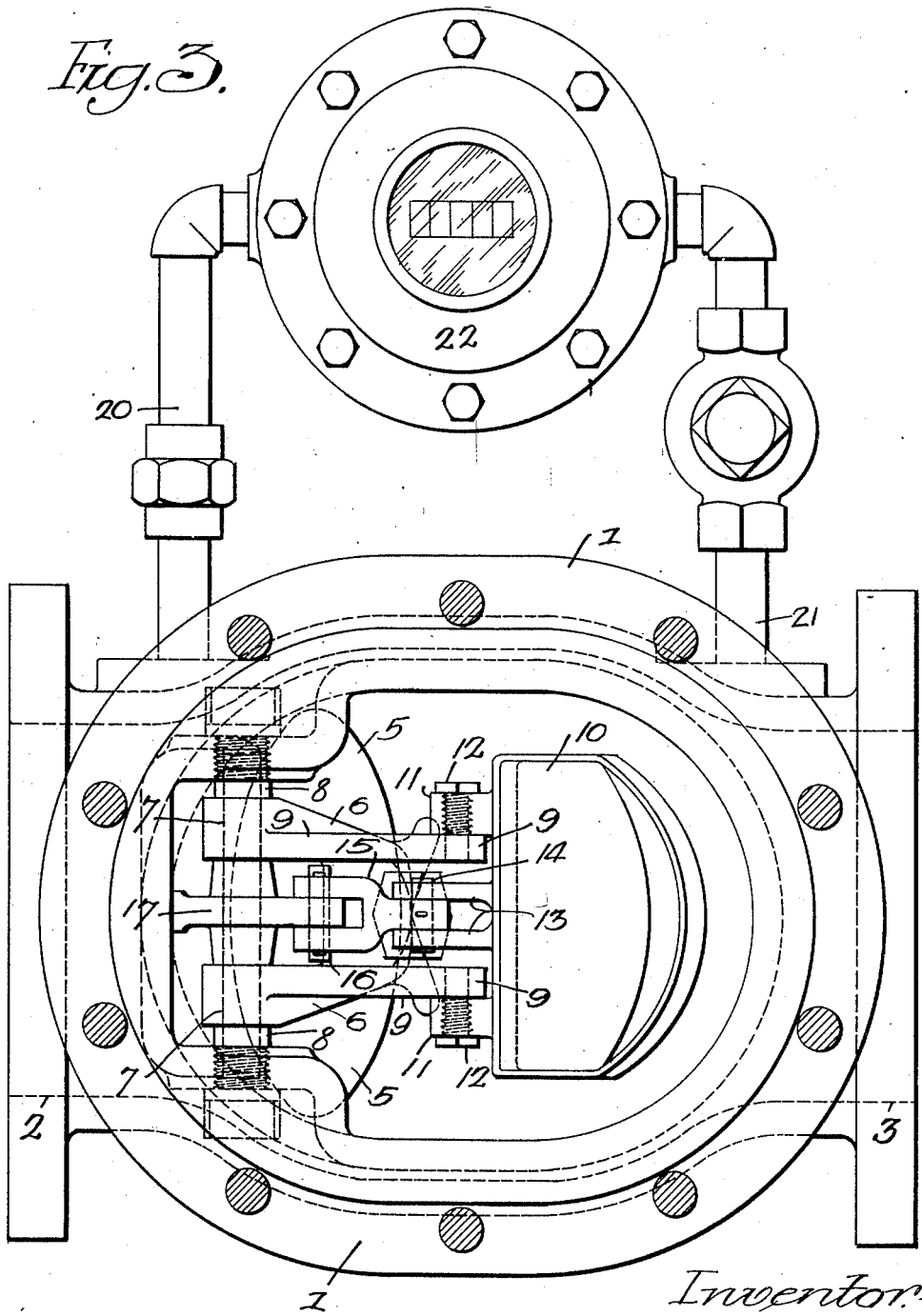

Patented July 9, 1929.

1,720,444

UNITED STATES PATENT OFFICE.

ARTHUR C. ROWLEY, OF PHILADELPHIA, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA.

BY-PASS CHECK VALVE FOR SPRINKLER SYSTEMS.

Application filed March 5, 1925. Serial No. 13,262.

This invention relates to sprinkler and similar systems.

The invention resides in the provision of a novel form of check valve constructed to exert a predetermined closing force when in the closed position and a lesser force tending to close the valve after it has once been opened.

In the attached drawings:

Figure 2 is a section similar to that shown in Fig. 1 showing the valve open, and Figure 3 is a plan view of the valve.

Figure 1:
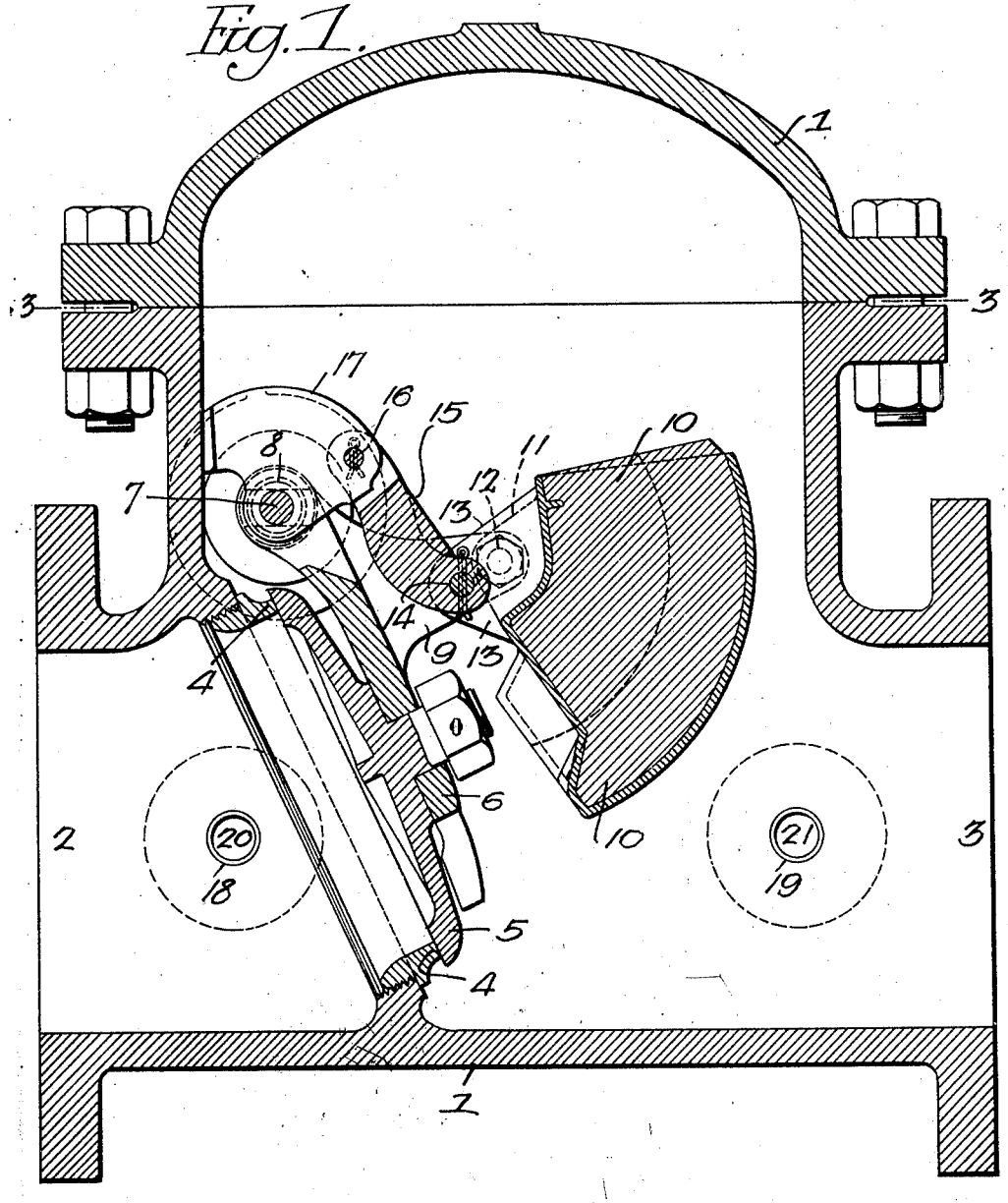
Figure 1 is a vertical section through a valve made in accordance with my invention showing the valve closed.

With reference to the drawings, the valve may comprise the usual casing 1 having main inlet and outlet ports 2 and 3 respectively, and in the interior thereof a seat 4 for the valve or clapper 5. The clapper 5, as in the standard form of check valve, is carried by a lever 6 which swings upon a shaft 7 whose ends are suitably supported in the casing 1. The ends of the shaft 7 in the present instance are supported in hollow studs 8, 8, threaded into opposite sides of the casing. The lever 6 in the present instance has integral therewith and extending therefrom arms 9, 9, to the outer ends of which is pivotally secured a weight 10, said weight having at its rear lugs 11, 11, openings into which are threaded bolts 12, 12, whose inner ends are lodged in suitable bearing apertures in the arms 9, 9, thereby constituting trunnions for the said weight. The weight body 10 also has projecting rearwardly spaced arms 13, 13, which lie intermediate the arms 9, 9, of the lever 6, and which have connected thereto by means of a pin 14 a link 15 which is connected pivotally, through a pin 16, to a member 17 on the shaft 7, said member lying intermediate the inner ends of the arms 9, 9, as shown in Fig. 3, and normally bearing against the adjacent wall of the casing 1.

The casing 1 also comprises, one on either side of the valve when the latter is closed, ports 18 and 19 which may be connected respectively through suitable pipe lines 20 and 21 to the intake and outlet openings of a standard small size meter 22, the meter thus being placed on a by-pass.

In operation, the valve may be installed in the main supply line of a sprinkler or other system. Normally the system is filled with water, and under these circumstances the pressure being balanced the valve 5 will rest upon its seat 4. In this position of the valve, shown in Fig. 1, the weight 10 assumes a position in which its center of gravity lies well outside the axis of the pivot pins 12; that is, on the side of said pivot pins away from the axis of the shaft 7 upon which the clapper is pivoted. The weight is retained in this position through the link 15 and the member 17 which as previously described bears against the wall of the casing, the link 15 forming with the arms 13, 13, of the weight a toggle which while preventing the weight from moving downwardly around its pivots 12 beyond the position in which it is shown as supported in Fig. 1, still permits a movement of the weight in the reverse direction or toward the shaft 7, as hereinafter described. Under these conditions, the pressure of the weight tending to maintain the valve upon its seat is materially greater than its actual weight by reason of the advantageous leverage resulting from its overhanging suspended position, and by reason further of the fact that the pressure of the member 10 upon the valve due to its weight and to its advantageous position with respect to the valve pivot is supplemented by the reaction of the member through the linkage 15–17 with the wall of the casing. In other words, the arrangement is such that the pressure exerted upon the casing by the weight member through the parts 15 and 17 opposes elevation of the valve and augments the normal pressure of the member 10.

With the valve closed, any small quantity of water either drawn from the sprinkler system purposely or accidentally leaking from the system will pass through the by-pass and the meter 22, and the amount of such flow will be registered thereon. The maximum permissable amount of such withdrawal before creating such an unbalance as to tend to unseat the valve 5 may, of course, be regulated by the size of the weight 10, although it is obvious that the closing pressure must not exceed under any circumstances the pressure of the main.

In the event of fire, the sudden opening of the sprinklers causes the pressure of the main to throw open the valve 5, and when so opened, the aforedescribed link is such as to bring the weight 10 into the position shown in Fig. 2. It will be apparent under these circumstances that the center of gravity of the weight is carried back to a position in a vertical plane intermediate the pivot pins 12, 12, and the axis of the shaft 7, or considerably nearer the latter axis than before, whereby the pressure of the weight tending to close the valve is materially reduced, the aforesaid reaction and advantageous leverage being entirely eliminated. Under these circumstances, the frictional opposition of the valve to the free passage of the water is reduced to that caused only by the actual weight of the parts.

I claim:

1. In a check valve, a casing, a valve seat therein, a clapper movably supported in the casing and cooperating with the valve seat, a weight supported by the clapper and thereby exerting a normal pressure tending to hold the clapper on the seat, and means for reacting the weight with the wall of the casing to create an additional pressure on the clapper augmenting said normal pressure.

2. In a check valve, a casing, a valve seat therein, a clapper movably supported in the casing and cooperating with the valve seat, a weight supported by the clapper and thereby exerting a normal pressure tending to hold the clapper on the seat, and a system of links operatively connected with the weight through which the latter reacts with the wall of the casing to thereby create an additional pressure on the clapper augmenting said normal pressure.

3. In a check valve, a casing, a valve seat therein, a clapper movably supported in the casing and cooperating with the valve seat, a weight pivotally mounted on the clapper and thereby exerting a normal pressure tending to hold the clapper on the seat, a member pivotally mounted within the casing adjacent the wall thereof, and a link connecting the weight with said member whereby the weight may react with the wall of the casing to create an additional pressure on the clapper augmenting said normal pressure.

4. In a check valve, a casing, a valve seat therein, a clapper pivotally supported in the casing and cooperating with the valve seat, a weight pivotally mounted on the clapper and thereby exerting a normal pressure tending to hold the clapper on the seat, a member having a pivotal mounting corresponding with the axis of the clapper pivot and adapted to engage the wall of the casing, and a link interconnecting the weight with said member whereby the weight may react with the wall of the casing to thereby create an additional pressure on the clapper augmenting said normal pressure.

5. In a check valve, a casing, a valve seat therein, a clapper movably supported in the casing and cooperating with the valve seat, a weight supported by the clapper and thereby exerting a normal pressure tending to hold the clapper on the seat, and means operative only when the clapper is on the seat for reacting the weight with the wall of the casing to create an additional pressure on the clapper augmenting said normal pressure.

6. In a check valve, a casing, a valve seat therein, a clapper movably supported in the casing and cooperating with the valve seat, weighted means supported by the clapper and thereby exerting a pressure tending to hold the clapper on the seat and to return the clapper to the seat from an elevated position, and means operatively connected with said weight for augmenting said normal pressure when the clapper is on the seat.

7. In a check valve, a casing, a valve seat therein, a clapper movably supported in the casing and cooperating with the valve seat, weighted means supported by the clapper and thereby exerting a pressure tending to hold the clapper on the seat and to return the clapper to the seat from an elevated position, means operatively connected with said weight for creating an additional pressure augmenting said normal pressure when the clapper is on the seat, and means for automatically relieving said additional pressure when the clapper is elevated to a predetermined extent from said seat.

ARTHUR C. ROWLEY.